United States Patent [19]

Cornwall

[11] 4,420,176
[45] Dec. 13, 1983

[54] ELASTOMERIC JOINT FOR USE BETWEEN RIGID FITTINGS AND RIGID PIPE AND METHOD OF USE

[76] Inventor: Kenneth R. Cornwall, 30064 Bentley, Livonia, Mich. 48154

[21] Appl. No.: 267,636

[22] Filed: May 27, 1981

[51] Int. Cl.³ .............................................. F16L 5/00
[52] U.S. Cl. ..................................... 285/158; 285/31; 285/236; 285/383; 285/423; 285/DIG. 16; 29/445; 29/450
[58] Field of Search ................. 285/235, 236, 383, 12, 285/21, 8, 158, 423, 31, DIG. 12, DIG. 16, 18; 29/445, 450

[56] References Cited

U.S. PATENT DOCUMENTS

| 2,785,910 | 3/1957 | Munger ................. 285/DIG. 16 X |
| 4,058,330 | 11/1977 | Wolf ................................ 285/423 X |
| 4,076,283 | 2/1978 | Harrison ........................ 285/236 X |
| 4,116,474 | 9/1978 | Wolf ................................ 285/235 X |
| 4,261,598 | 4/1981 | Cornwall .................... 285/DIG. 16 |

Primary Examiner—Dave W. Arola
Attorney, Agent, or Firm—Ian C. McLeod

[57] ABSTRACT

An elastomeric joint (10) for use with couplings (100), pipe (201 to 204), connectors (205) and the like is described. The elastomeric joint is particularly adapted to provide ease of mounting of the pipe, particularly plastic pipe, between couplings embedded in the floors (500 and 500a) in the construction of buildings.

10 Claims, 6 Drawing Figures

ELASTOMERIC JOINT FOR USE BETWEEN RIGID FITTINGS AND RIGID PIPE AND METHOD OF USE

DESCRIPTION OF THE INVENTION

1. Field of the Invention

The present invention relates to an elastomeric joint adapted for use between rigid plastic pipe and fittings of various types. The elastomeric joint provides ease of installation of pipe under circumstances where couplings or other fittings are secured in position during construction of buildings.

2. Prior Art

The prior art has described flexible and sometimes elastic sleeves to join two pipes together using separate compression clamps or bands around the sleeve between abutting ends of pipe. The sleeves can shift or slip in time causing problems.

Concrete floor embedded couplings for plastic pipes are described in my U.S. Pat. No. 4,261,598. These couplings work very well; however, once two of such couplings are fixed in cement between floors, two sections of plastic pipe must be fitted with a sleeve between the floors in order to position the pipe. This construction provides a relatively weak union between the couplings and the pipe. The same problem occurs in other construction where fittings are fixed in position.

OBJECTS

It is therefore an object of the present invention to provide an improved elastomeric joint which is adapted for securely joining the end of a rigid pipe to a rigid coupling or other fitting particularly after they have been anchored in position in the building. Further still it is an object of the present invention to provide an elastomeric joint which reduces the risk that the joint will rupture in service. Finally it is an object of the present invention to provide an elastomeric joint which is simple and inexpensive to manufacture and provides ease of installation. These and other objects of the present invention will become apparent from the following description and the drawings.

IN THE DRAWINGS

GENERAL DESCRIPTION

The present invention relates to an elastomeric joint adapted for joining rigid pipe to a rigid pipe fitting or coupling having a cylindrical opening and inner surface adapted for sealing with the rigid piping and with an annular ring projecting from the inner surface for abutting with an end of the piping which comprises an integral tubular elastomeric joint with two spaced apart ends perpendicular to and around a longitudinal axis and having a larger diameter section and a smaller diameter section along the axis with inside and outside surfaces on each section defining walls and with spaced apart annular shoulders on the inside and outside surfaces of the joint intermediate the sections, wherein the outside surface of the smaller section is cylindrical and adapted to be sealed with the rigid fitting with the end of the smaller section abutting the annular ring of the rigid coupling and with the outside shoulder abutting on a lip of the opening of the rigid coupling, and wherein the larger section has a cylindrical inner surface for sealing with the rigid pipe with the wall thickness such that, with the smaller section inserted in the coupling opening prior to attachment to the pipe, the larger section can be flexed outward and over the outside surface of the coupling or inward inside the opening of the rigid coupling.

Further the present invention relates to the improved method of joining rigid pipe with a rigid fitting having a cylindrical opening and inner surface adapted for sealing with rigid piping wherein the pipe and fitting are to be placed in a fixed position in a building which comprises providing a rigid fitting having a cylindrical opening and inner surface adapted for sealing with rigid piping and having an annular ring projecting from the inner surface for abutting with an end of piping with the fitting sealed to a tubular elastomeric joint which abuts on the ring such that an extended portion of the joint extends from the opening; turning the extended portion of the joint into the opening or around the outside of the rigid fitting prior to or after positioning the fitting, positioning the extended portion of the joint over the outside of a pipe after the fitting is fixed in position; and providing a locking means around the extended portion of the joint so as to compress and seal the joint to the pipe.

SPECIFIC DESCRIPTION

Figure 1:
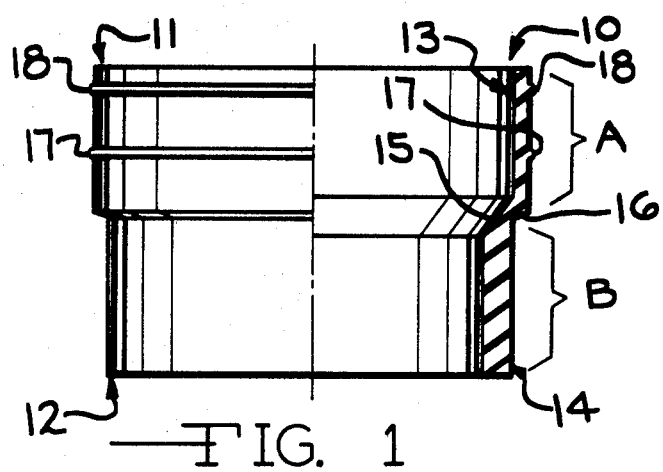
FIG. 1 is a front partial cross-sectional view of the elastomeric joint of the present invention.

Referring to FIG. 1 the preferred elastomeric joint 10 is shown independently of its use setting. The joint 10 includes spaced apart parallel circular ends 11 and 12 perpendicular to and around the longitudinal axis. The joint 10 includes a larger diameter Section A and a smaller diameter section B with an inside surface 13 and an outside surface 14 in each Section A and B forming walls. Intermediate the sections A and B are inside shoulder 15 and outside shoulder 16.

Figure 2:
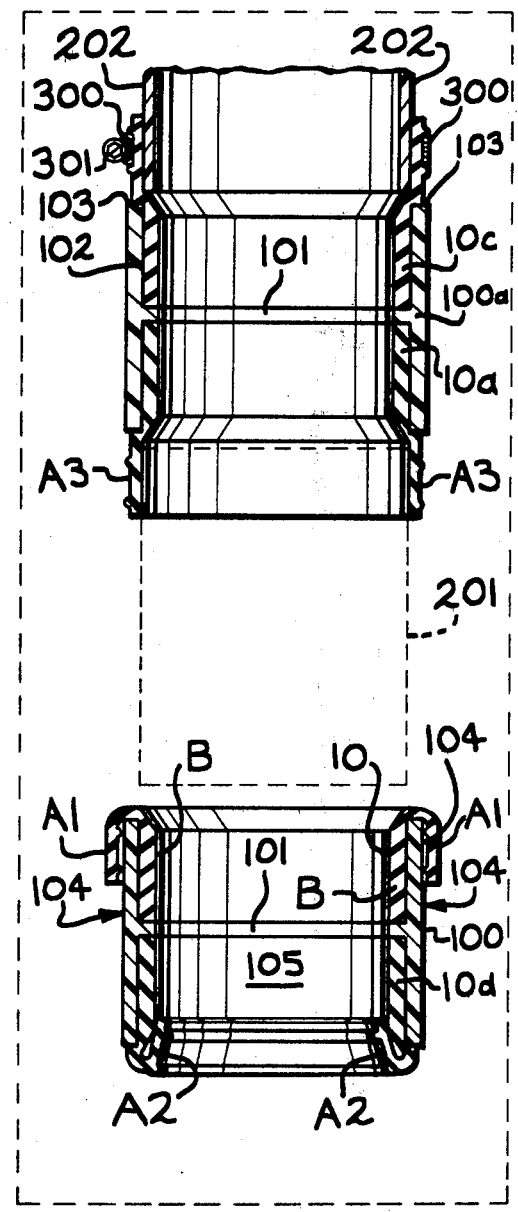
FIG. 2 is a front cross-sectional view of the elastomeric joint shown in FIG. 1 along with a similar joint in the setting of a building shown by the dotted lines with fittings such as couplings of the type adapted to be embedded in cement floors in the building.
Figure 4:
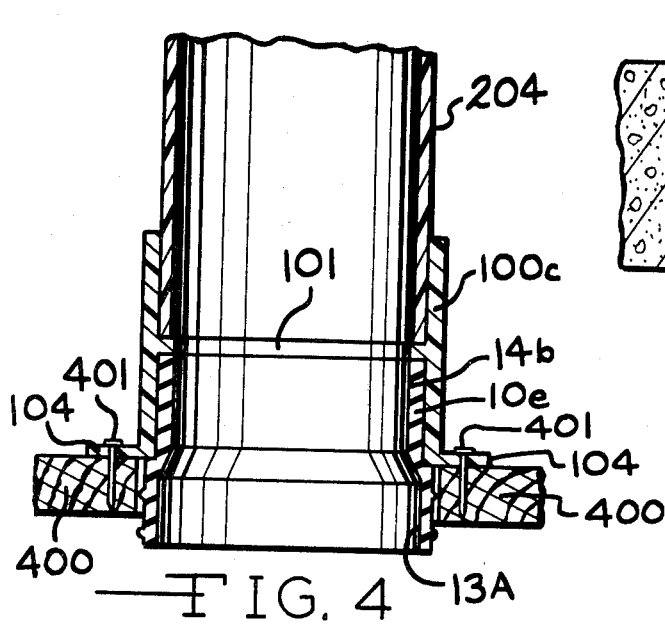
FIGS. 4 to 6 are front cross-sectional views shown by the preferred steps in positioning elastomeric joints in a building between cement floors.

As shown in FIG. 2, wherein the dotted lines represent a building, the outside surface 14 of the smaller section B is adapted to be sealed with the inside of fittings 100 and 100a with the end 12 of the smaller section B abutting on part of an annular ring 101 projecting from an inner surface 102 of the fittings 100 and 100a. The ring 101 is conventionally adapted to mate with a corresponding end of a pipe 204 as shown by coupling 100c in FIG. 4. The outside shoulder 16 is adapted to abut on an end 103 of the fitting 100. Solvent welding (not shown) is used to seal and hold the small section B onto the fitting 100. Identical joints 10a, 10b, 10c and 10d are also shown in FIG. 2.

The inside surface 13 of the larger section A is adapted for sealing with an end of a rigid pipe 201 (shown in dotted lines in FIG. 2). As shown in the lower part of FIG. 2 for fitting 100, section A can either be: (1) flexed outward and over the outside surface 104 of the fitting 100 as shown by A, or; (2) flexed inward and inside the opening 105 of the rigid fitting 100 as shown by $A_2$. This construction permits fittings 100 and 100a to be rigidly positioned in a building without being concerned about later positioning pipe 201.

Figure 3:
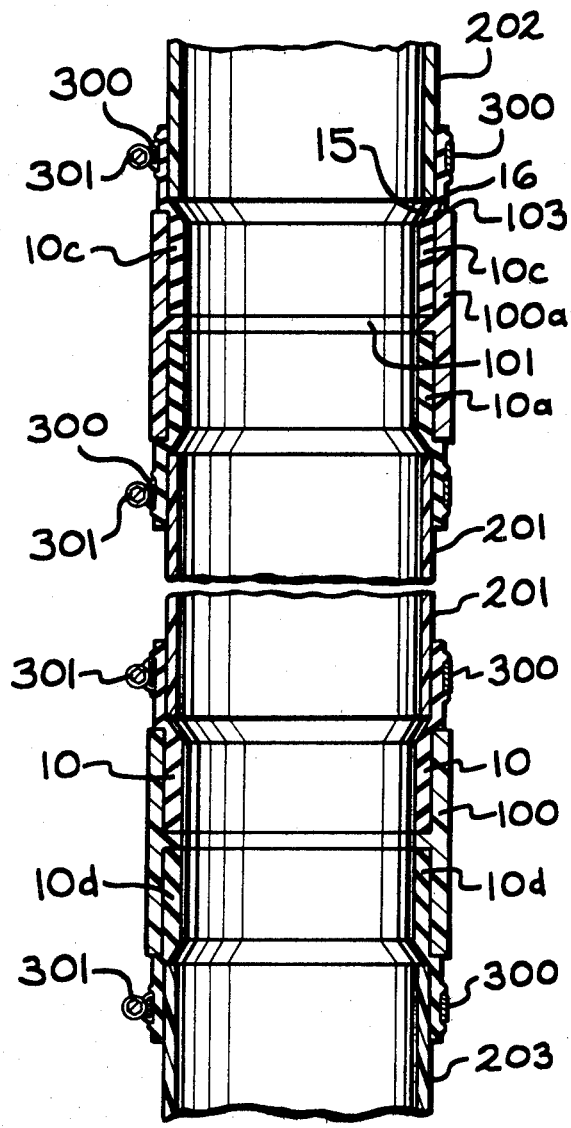
FIG. 3 is a front cross-sectional view of the joints of FIG. 2 showing a section of pipe between the two spaced apart elastomeric joints.

As shown by FIGS. 2 and 3, pipe 201 can be easily positioned between fittings 100 and 100a by folding section $A_3$ of joint 10a in fitting 100a over the outside of the pipe 201 and fitting a compression ring clamp 300 tightened by screw 301. Pipe 201 is then positioned over section $A_1$ of fitting 100 which is folded over the pipe 201 and fitted with compression ring clamp 300. The outside surfaces 14 of Section $A_1$ to $A_3$ are preferably provided with parallel ridges 17 and 18 for locating and positioning the clamps 300.

As shown in FIG. 1 the inside shoulder 15 of the joint 10 is preferably tapered towards the longitudinal axis from the larger section A towards the smaller section B and is in closely spaced relation to the outside shoulder 16. This construction provides compact construction. Also the inside surface of section A is preferably the same diameter as the outside surface 14 of smaller section B. This construction allows the standard mated pipe couplings or other fittings to be used with the joint 10.

The joint 10 is usually solvent welded at the outside 14 of the smaller section B with a fitting 100. Other constructions can be used. The outside surface 14 of the section A is usually clamped to the outside of a pipe 201 or 202 or 203 by clamp 300. In both instances other bonding or holding means can be used.

Figure 5:
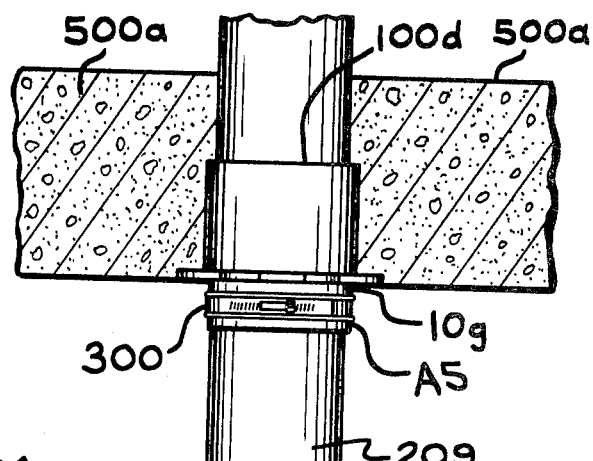
Figure 5:
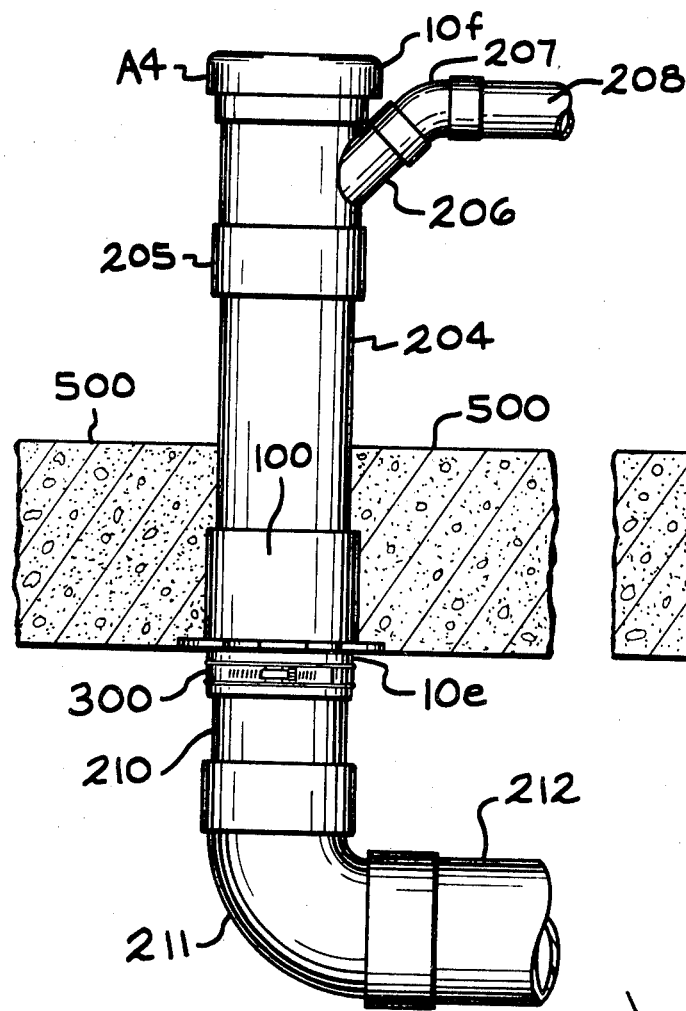
Figure 6:
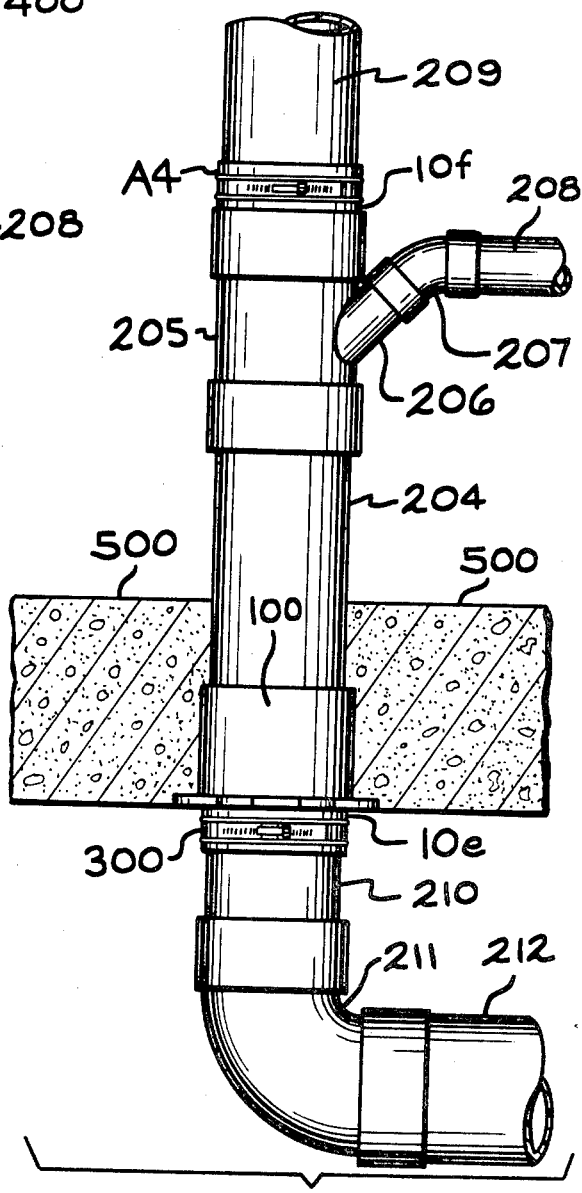

FIGS. 5 to 7 show the use of the elastomeric joints 10e, 10f and 10g in a particular use setting. In FIG. 5, a coupling 100c is mounted on a wooden form 400 by nails 401 through tabs 104. A pipe section 204 is positioned and solvent welded in the coupling 100c. Joint 10e is also solvent welded in coupling 100c. The cement floors 500 and 500a are poured, set and then form 400 is removed. Couplings and pipes 205, 206, 207 and 208 are then solvent welded in position. Joint 10f is cemented into coupling 205 and large section $A_4$ is flexed over the opening of the coupling 205. Pipe 209 is then clamped in place inside larger section $A_5$ of a coupling 100d, positioned over folded section $A_4$, which is then folded over the end of pipe 209 and fixed in position with clamp 300. Similarly pipes 210 and 212, and elbow 211 are positioned in joint 10e.

The rigid fittings and pipe are preferably made of plastic and are available in standard sizes. It has been found that large lengths of assembled piping with the flexible joints can be used particularly between floors since the joints compensate for thermal expansion and contraction. Currently no more than about 60 feet of rigid pipe and fittings fixed in position is permitted because of thermal expansion problems.

I claim:

1. An elastomeric joint adapted for joining rigid pipe to a rigid fitting having a cylindrical opening and inner surface adapted for sealing engagement with an outside portion of the rigid pipe and the pipe fitting having an annular ring projecting from the inner surface for abutting with an end of the rigid pipe which comprises:
an integral tubular elastomeric joint with two spaced apart ends perpendicular to and around a longitudinal axis and having a larger diameter section and a smaller diameter section along the axis between the ends with inside and outside surfaces on each section defining walls and with spaced apart annular shoulders on the inside and outside surfaces of the joint intermediate the sections,
wherein the outside surface of the smaller section of the joint is cylindrical and adapted to be sealed with the inner surface of the rigid fitting with the end of the smaller section abutting on the annular ring of the rigid fitting and with the outside shoulder abutting on a lip of the opening of the rigid fitting, and
wherein the larger section of the joint has a cylindrical inside surface for sealing with an outside portion of the rigid pipe so that the pipe is separated by the joint from the rigid fitting and so that the larger section of the joint can be clamped to the pipe by a locking means, wherein the wall thickness of the larger section is such that, with the smaller section inserted in the rigid fitting opening prior to attachment to the pipe, the larger section can be flexed outward and over the outside surface of the fitting or inward inside the opening of the rigid fitting.

2. The joint of claim 1 wherein the inside shoulder is tapered towards the axis from the larger section towards the smaller section in closely spaced relation to the outside shoulder.

3. The joint of claim 1 or 2 wherein the joint is made of elastomeric polyvinyl chloride which can be solvent welded to the pipe and pipe fitting which are made of a compatible plastic.

4. The joint of claim 1 or 2 wherein the outside diameter of the smaller section is approximately the same as the inside diameter of the larger section.

5. The joint of claim 1 in combination with the rigid fitting made of plastic such that the outside of the smaller section of the joint is sealed to the inner surface of the fitting.

6. The joint and rigid fitting of claim 5 in combination with a pipe positioned inside the larger section of the joint with a locking means around the outside of the joint and pipe over the larger section which compresses and seals the larger section on the pipe.

7. In the method of joining a rigid fitting having a cylindrical opening and inner surface adapted for sealing with an outside portion of rigid pipe wherein the pipe and fitting are to be placed in a fixed position in a building the improvement which comprises:
(a) providing a rigid fitting, having a cylindrical opening and inner surface adapted for sealing engagement with an outside portion of rigid pipe and having an annular ring projecting from the inner surface which can abut with an end of rigid pipe, with the inner surface of the fitting sealed to a tubular elastomeric joint which abuts on the ring, wherein an extended portion of the joint extends from the opening;
(b) turning the extended portion of the joint into the opening or around the outside of the rigid fitting prior to or after positioning the fitting in a fixed position in a building;
(c) positioning the extended portion of the joint over the outside of a pipe after the rigid fitting is mounted in position in the building; and
(e) providing a locking means around the extended portion so as to compress and seal the joint to the pipe.

8. The method of claim 7 wherein the flexible joint includes two spaced apart ends around a longitudinal axis and having a large diameter section and a smaller diameter section along the axis with inside and outside surfaces on each section defining walls and with spaced apart annular shoulders on the inside and outside surfaces of the joint intermediate the sections, wherein the outside surface of the smaller section is cylindrical and adapted to be sealed with the rigid fitting with the end of the smaller section abutting the annular ring of the rigid fitting and with the outside shoulder abutting on a lip of the opening of the rigid fitting and wherein the larger section has a cylindrical inner surface for sealing with the rigid pipe and with the wall thickness such that with the smaller section inserted in the fitting opening prior to attachment of the pipe the larger section can be flexed outward and over the outside surface of the fitting or inward inside the opening of the rigid fitting.

9. The method of claim 7 wherein the rigid fitting is a coupling adapted to be embedded through concrete and has the smaller section of the joint sealed to the inside of the coupling with the larger section flexed inward inside the opening and is positioned in the concrete with the larger section of the joint facing towards an opening in the concrete prior to positioning the joint on the pipe.

10. The method of claim 9 wherein at least two joints are used between two couplings as the fittings embedded in spaced apart cement floors.

* * * * *